Figure 1:
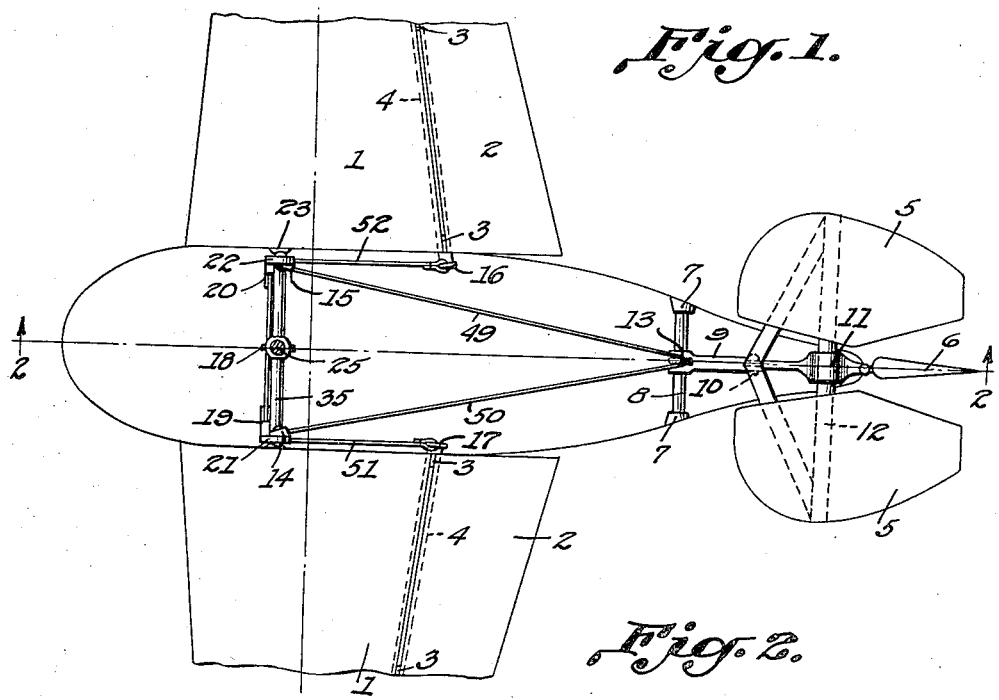

Aug. 10, 1937.         B. S. WELSHER         2,089,515
AUTOMATIC BALANCING OF AIRPLANES
Filed July 1, 1935

Inventor:
Burdette Star Welsher

Patented Aug. 10, 1937

2,089,515

UNITED STATES PATENT OFFICE 2,089,515

AUTOMATIC BALANCING OF AIRPLANES

Burdette Star Welsher, San Luis Obispo, Calif.

Application July 1, 1935, Serial No. 29,409

1 Claim. (Cl. 244—82)

This invention relates to the discovery shown and described in my Patent No. 1,915,809, whereas if approximately between 20 to 40% of the trailing edge of a wing be attached hingedly and allowed to rotate in the same direction in a certain predetermined ratio to that of the forward portion of the wing to which it is attached, not only will there be a certain positive tendency for the wing and flap to remain in one positive position to the relative wind, but also due to the correct ratio of movement of the flap to the wing there will be a movement when there is a sudden change of relative wind that will instantaneously rotate the wing to its former angle thus doing away with the airplane tending to accelerate vertically. It should be easily understood that if a control mechanism be arranged that tends to stay an airplane at a certain angle to the relative wind it must stay at that angle at all times irrespective of the number of changes it may make to the ground. It should also be understood that by splitting the wing into a forward and flap part as formerly described and gearing the flap to rotate from its neutral position in either direction as the forward part moves entirely changes the center of pressure movement of the complete wing assembly as described from that of an ordinary wing of geometric planform in that it is just opposite. It also relates to an improvement in the method of attaching the forward portion of the wings, shown in the above mentioned patent, to an airplane fuselage, and a method of controlling the entire structure. The object of the improvement is to eliminate the difficulties of constructing an airplane having a pivotally fixed wing connected by bearings to its fuselage, and to provide a means of rotating the forward portion of the wings about an imaginary axis, known as the center of gravity of the airplane, by using an adaptable control system connecting the flaps and a movable tail surface.

The advantages of a structure of this type over the present practice are many. The flap has been used for some time on the more modern ships and its use is widely known, whereas it decreases the landing speed and allows a smaller area of wing in normal flight which in turn allows a smaller area of wing for drag giving a faster cruising speed. In addition to this the flaps are also used to obtain lateral stability thus eliminating a special control for ailerons and flap movement. The desired function of the different parts or surfaces is accomplished by the use of a means of control over the entire structure of such a type that complete maneuverability at all times can be accomplished but upon release of the stick the ship will return to a definite predetermined position of flight. An airplane embodying a structure of this type would not be subject to unexpected nose dives or climbs due to sudden changes of relative wind or would in no way be effected by it other than to maintain its previous angle with it which of course would necessitate the airplane to change its angle to the ground. Since the ground is in no way connected with the airplane in flight, other than to cause a pulling force down on it, which is called the force of gravity and is considered as centered at a certain point which does not change location no matter what attitude the ship may be in, there are left but three variable factors to deal with, namely, the direction of the relative wind, the amount of lift counteracting the force of gravity, and the moment of inertia forces in it which is dependent on the direction of flight for its direction. Since the inertia forces in an airplane tend to make it travel in a straight line and cause great loads to be built up within itself when its direction of travel is forcibly changed, it can be seen that if the wing is made to follow the relative wind that the lift of the wing will be constant. The effect of this action will cause an airplane to travel the path like that of a power balloon, dirigible, or blimp except that the rising and falling will be greatly reduced due to the greatly increased speed of an airplane and the effect of the inertia forces tending to keep it in a straight line plane. The tendency of an object to move along a straight line can be illustrated by observing an airplane with respect to its vertical axis. The rudder may be applied in an effort to change the airplane's direction, but unless the aileron is applied to cause a force that will lift one side of the ship it skids or tends to continue in a straight line. When the relative wind changes this change causes a variation of pressure on the opposite sides of the flaps causing a change in what is sometimes called the hinge moment. The amount or greatness of this change will be dependent on the amount of change of the wind at that instant. This force is transmitted to the tail to cause a force there that will keep the structure at the same angle to the relative wind at all times. A means whereby this action will be accomplished will be shown in the following paragraphs.

Figure 2:
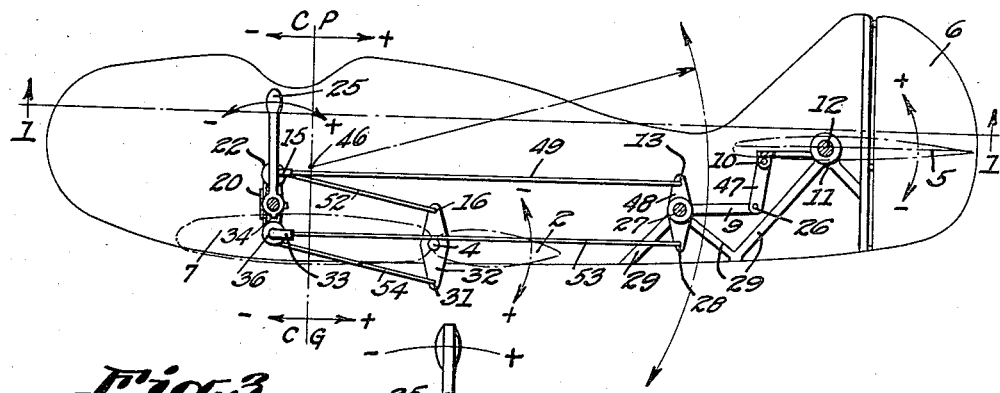
Figure 3:
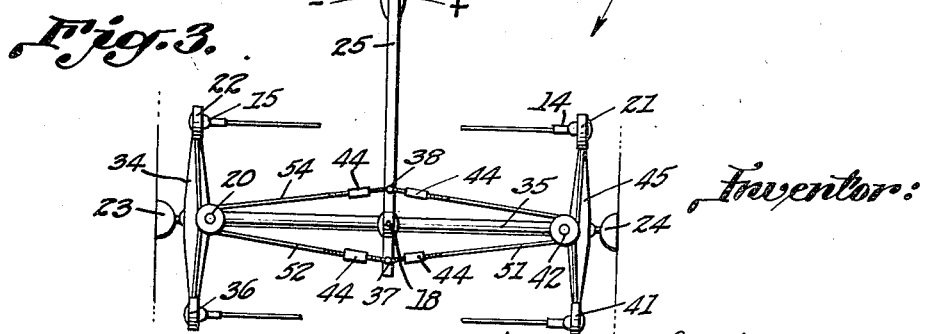

The form of the invention is illustrated in the accompanying drawing in which Figure 1 is a top view cut from Figure 2 at I—I and Figure 2 is a side center view cut at 2—2 from Figure 1. The same numbers in Figures 1 and 2 are used to designate the same parts. The half of the fuselage not shown in Figure 2 is identical to that shown. Figure 3 is taken from a front view of the control mechanism shown in Figures 1 and 2.

Since the parts in Figures 1 and 2 of the drawing are the same, and certain features are not completely shown in each figure, all views will be recited together unless otherwise designated. Number 1 is the forward portion of the wing. Number 2 is the flaps. Number 3 designates the points of attachment of the flap to the front portion of the wing, connected pivotally. Number 4 is a torque tube connected solidly to 2 and control horn 16 or 17 for purposes of control. Number 5 is a tail surface pivotally connected to an airplane fuselage by bearing 11. Number 6 is the rudder. Number 7 are bearings connected solidly to the members of the fuselage. Number 8 is a shaft pivotally attached to 7 and solidly to 13 and 9 and 28. Number 9 is a shaft attached solidly to 48 and pivotally to 47 at 26. Number 10 connects 47 pivotally to 5. Bearing 11 connects shaft 12 and surface 5 pivotally to the fuselage. Shaft 12 is connected solidly to 5 and pivotally to 11. Number 13 is a cable connection. Numbers 14, 16, 17, and 31 are also cable connections. 18 is a connection which allows stick 25 to move (+) or (—) as shown in Figure 3. 19, 20, and 42 are pulleys allowing cables to move freely for lateral control. Numbers 23 and 24 are connected solidly to the fuselage and pivotally to shaft 35. Number 25 is the stick and in Figure 2 is free to move (+) or (—) on 23 and 24, and in Figure 3 to move (+) or (—) on 18. Numbers 29 are solidly attached fuselage members. Number 32 is a control horn solidly attached to 4 and 2 and pivotally to 1. Numbers 34 and 45 are control horns connected solidly to 35. Numbers 37 and 38 on 25 are points of attachment for the lateral control cables. Numbers 43 and 44 are turnbuckles illustrating a means of lengthening and shortening the cables to obtain stabilizing adjustment. Number 46 is a designated point known as the center of gravity about which the whole structure rotates. Number 49 is a cable terminating at points 13 and 15. Number 50 is a cable terminating at points 13 and 14. Number 51 is a cable terminating at points 17 and 37. Number 52 is a cable terminating at points 16 and 37. Number 53 is a cable terminating at points 28 and 33. Number 54 is a cable terminating at points 31 and 38. Cable 55 terminates at 38 and a point not shown on the drawing.

The action of the parts, using all drawings to illustrate is as follows: In Figure 2 when the stick 25 is moved (+), surface 2 is moved (+) and surface 5 is moved (+), thus causing the entire structure to move (+) about its center of gravity 46. When the stick is moved (—), the surface 2 moves (—), and the surface 5 moves (—), thus causing the entire structure to move (—). When pressure is released from stick 25 the surfaces will return to their respective positions. As stated before the reason for this return to the neutral position of the different parts is because of the moving of the flap 2 in a certain ratio in the same direction as that of the rest of the structure to cause a center of pressure to move in a (+) direction when the former above mentioned action was made, and inversely when the latter above mentioned action was made. In Figure 3 when the stick is moved (+) the right flap will lower and the left flap will raise causing the right wing to rise and the left to lower, as is conventional aileron action.

In the event of flying through very bumpy air due to mountainous regions or unsettled weather conditions the mechanism as set forth in the drawing and previously explained in the specification is of such arrangement, due entirely to the action of the flaps 2 tending to follow the front part of the wing in a position where the air pressures on their opposite sides are equal, that they will move in the same direction on 3 as the wind direction changes. The action of the forward portion of the wing 1, in coordination with the horizontal tail surface 5, attached through the controls to the flap 2 will be shown. In flight an airplane must be in equilibrium, that is the center of pressure of the airplane must be over its center of gravity if it is to maintain straight line flight as shown in Figure 2. It will be assumed that such is the case in illustrating the action of the different parts relative to each other and that their position in this condition is as shown in the drawing. The force causing flap 2 to move may be either caused by mechanical force through the controls by a pilot or by a change of the air load on the flap itself due to a sudden change of the wind on the structure. The fact that there is a force as mentioned due to air load caused by sudden changes of wind can be illustrated by a simple review of the forces on a common airfoil. As the angle of attack of a conventional wing increases from a —5 degrees to a maximum +15 degrees the pressures on the rear of the wing or the portion I use as flaps on my wing changes such that from a —5 degrees to approximately 0 or +1 degree tends to drop downward and from a 0 or +1 degree to a maximum of +15 degrees tends to lift upward. If the trailing edge is actually made into a flap as shown and hinged to the rest of the wing and held in place as shown by a control arm attached to scales it would be found that the force or hinge moment for each range of angle of attack would increase oppositely from a neutral point of 0 or +1 degree as the angle of attack increased to +15 or decreased to —5 degrees. Assuming the wing to be attached as shown in Figure 2 and the angle of attack unexpectedly increased due to a change of wind the flap 2 would go up (—) accompanied by a change of center of pressure of the wing in a (—) direction on the wing causing instability that would cause the wing or airplane to go up if the flaps 2 were not connected directly to the elevator. The flaps 2 however do not go up unless it moves the elevator 5 in a (—) direction which it will do when that movement of the flap occurs. The hinge moment of the flap will be transferred to the elevator causing the structure to rotate about its center of gravity in a (—) direction due to the center of pressure of the entire structure overcoming the center of pressure of the wing to tend to rotate (+) because of the distance between the tail surface and the center of gravity causing a greater leverage with the same hinge moment. Therefore since the flap 2 is attached through an almost frictionless control mechanism that does not hinder free movement between the said surfaces at the will of external forces on them, any force that would change the angle of the flap 2 to that of the main wing would be transmitted through the structure to the forward portion of the wing 1 thus changing that body's angle of attack to the ground, in a direction that would maintain its previous angle with the relative wind.

I claim:

In an airplane having a fuselage, a main supporting wing comprising a forward portion rigidly fixed with respect to the fuselage and a rearward portion constituting a substantially full span flap pivotally carried by the forward portion, the area of the forward portion being approximately two thirds of the total area of the wing, an elevator pivotally carried at the rear of the fuselage, and mechanism connecting the pivotally carried portion of the main wing with said elevator, said mechanism being so constructed and arranged that movement of the pivotally carried portion of the main wing in one direction will cause a simultaneous movement of the elevator in the opposite direction.

BURDETTE STAR WELSHER.